US 12,259,975 B2

(12) United States Patent
Gupta (10) Patent No.: US 12,259,975 B2
(45) Date of Patent: Mar. 25, 2025

(54) PROTECTING AGAINST MEMORY DESERIALIZATION ATTACKS

(71) Applicant: Virsec Systems, Inc., San Jose, CA (US)

(72) Inventor: Satya V. Gupta, Dublin, CA (US)

(73) Assignee: Virsec Systems, Inc., San Jose, CA (US)

( * ) Notice: Subject to any disclaimer, the term of this patent is extended or adjusted under 35 U.S.C. 154(b) by 437 days.

(21) Appl. No.: 17/646,511

(22) Filed: Dec. 30, 2021

(65) Prior Publication Data

US 2022/0215094 A1 Jul. 7, 2022

Related U.S. Application Data

(60) Provisional application No. 63/132,764, filed on Dec. 31, 2020.

(51) Int. Cl.
*G06F 21/56* (2013.01)

(52) U.S. Cl.
CPC .................................. *G06F 21/56* (2013.01)

(58) Field of Classification Search
CPC ....................................................... G06F 21/56
See application file for complete search history.

(56) References Cited

U.S. PATENT DOCUMENTS

| | | | | |
|---|---|---|---|---|
| 2020/0404007 | A1* | 12/2020 | Singh | G06F 16/24537 |
| 2021/0149788 | A1* | 5/2021 | Downie | G06F 11/3604 |
| 2021/0390182 | A1* | 12/2021 | Boutnaru | G06F 21/52 |

FOREIGN PATENT DOCUMENTS

| | | | | |
|---|---|---|---|---|
| CN | 111931185 A | * | 11/2020 | ........... G06F 21/577 |
| WO | 2020/161622 A1 | | 8/2020 | |
| WO | 2022/147466 A1 | | 7/2022 | |

OTHER PUBLICATIONS

"Java Serialization Magic Methods and Use Cases," Retrieved from the internet at: https://dzone.com/articles/java-serialization-magic-methods-and-use-cases, Retrieved from the internet on: Oct. 2, 2023, 8 pages.

"Proxy," Retrieved from the internet at: https://developer.mozilla.org/en-US/docs/Web/JavaScript/Reference/Global_Objects/Proxy, Retrieved from the internet on: Oct. 2, 2023 (10 pages).

"Python—Magic or Dunder Methods," Retrieved from the internet at: https://www.tutorialsteacher.com/python/magic-methods-in-python, Retrieved from the internet on: Oct. 2, 2023, 6 pages.

(Continued)

*Primary Examiner* — Esther B. Henderson
(74) *Attorney, Agent, or Firm* — Hamilton, Brook, Smith & Reynolds, P.C.

(57) ABSTRACT

Embodiments protect computer applications from memory deserialization attacks. An example embodiment receives a data object at a server hosting a software application. In turn, an aspect of the received data object is compared with a representation of an expected data object. If the comparison identifies a difference between the aspect of the received data object and the representation of the expected data object, a protection action is executed to limit a property of the received data object, thus protecting the software application from a memory deserialization attack.

21 Claims, 5 Drawing Sheets

(56) References Cited

OTHER PUBLICATIONS

"Security through obscurity," Retrieved from the internet at: https://en.wikipedia.org/wiki/Security_through_obscurity, Retrieved from the internet on: Oct. 2, 2023, 4 pages.

"The Multipart Content-Type," Retrieved from the internet at: https://www.w3.org/Protocols/rfc1341/7_2_Multipart.html, Retrieved from the internet on: Oct. 2, 2023, 6 pages.

Alex Stamos, "Becoming Secure by Design With SolarWinds", Solarwinds, 2021, 9 pages.

Cristalli, S., et al., "Trusted Execution Path for Protecting Java Applications Against Deserialization of Untrusted Data", Research in Attacks, Intrusions, and Defenses, Sep. 7, 2018, pp. 445-464.

Curphey, M., et al., "Improving Web Application Security", Threats and Countermeasures, Microsoft, Jan. 1, 2003, pp. 919.

Dhase, J., et al., "Code Reuse Attacks in PHP", Computer And Communications Security, Nov. 3, 2014, pp. 42-53.

International Search Report and Written Opinion received for PCT Patent Application No. PCT/US2021/073187, mailed on Apr. 12, 2022, 10 pages.

VirusTotal, Retrieved from the Internet at: https://www.virustotal.com/gui/file/c15abaf51e78ca56c0376522d699c978217bf041a3bd3c71d09193efa5717c71/community, Retrieved from the internet on: Oct. 2, 2023, 5 pages.

\* cited by examiner

PROTECTING AGAINST MEMORY DESERIALIZATION ATTACKS

RELATED APPLICATION

This Application claims the benefit of U.S. Provisional Application No. 63/132,764, filed on Dec. 31, 2020. The entire teachings of the above Application are incorporated herein by reference.

BACKGROUND

With each passing day, cyber-attacks are becoming increasingly sophisticated. Attacks are often targeted to exploit specific vulnerabilities in specific applications. Various methods and tools exist for identifying vulnerabilities in applications and protecting against cyber-attacks, but these existing methods and tools are inadequate.

SUMMARY

Embodiments provide functionality to protect computer applications from memory deserialization attacks.

An example embodiment is directed to a method for protecting a computer application from memory deserialization attacks. In an example implementation, the method begins by receiving a data object at a server hosting a computer software application. Next, an aspect of the received data object is compared with a representation of an expected data object. If the comparing identifies a difference between the aspect of the received data object and the representation of the expected data object, a protection action is executed to limit a property of the received data object. In this way, the method embodiment protects the computer software application from a memory deserialization attack.

In an example embodiment, the received data object is a user-provided packet, the aspect of the received data object is a hash thereof, the expected data object is a copy of the user-provided packet made and serialized prior to the user-provided packet being received by the server; and the representation of the expected data object is a hash thereof.

In another example embodiment, the method further includes decompiling the software application, prior to the data object being received by the server, to define a valid linking between classes, between methods, or between at least one class and at least one method of the software application. The method may further include building a control flow map for the software application by storing the defined valid linking in computer memory.

In some embodiments, the aspect of the received data object is a runtime-requested linking between classes, between methods, or between at least one class and at least one method of the software application. In such embodiments, the representation of the expected data object is the defined valid linking. In such embodiments, the identified difference includes at least one different linking in the runtime-requested linking and the defined valid linking.

In an example embodiment, the identified difference includes a reference to a magic method associated with the received data object. In yet another example embodiment, the identified difference includes a nested data object embedded within a boundary of the received data object.

In some embodiments, the method further includes reporting the identified difference to a central management system. In such embodiments, the central management system may be configured to automatically initiate the protection action in response to the identified difference. In some embodiments, the method further includes transmitting an indication of the identified difference to an analysis engine configured to run in a sidecar mode, a daemon mode, or a network mode in relation to the application. Such modes of the analysis engine are described in detail hereinbelow. In such embodiments, the analysis engine provides instrumentational functionality to examine user-provided data being received at the server. In such embodiments, the analysis engine may be configured to automatically initiate the protection action in response to receiving the indication of the identified difference.

According to an example embodiment, the protection action includes at least one of: terminating a login session of a user, interrupting communication between the server and a user, and suspending, terminating, or restarting the software application.

Another embodiment is directed to a system for protecting a software application from a memory deserialization attack. In the embodiment, the system includes a client-side protection module and a server-side protection module. According to an embodiment, the client-side protection module and server-side protection module are computer implemented modules. In such an embodiment, the modules are implemented by one or more processors executing computer code instructions.

According to an embodiment, the client-side protection module is configured to establish a representation of an expected data object based on a data object present at a client device. In the embodiment, the client device supports the client-side protection module and interfaces with a server hosting a software application. Further according to the embodiment, the server-side protection module is configured to (i) receive the data object and the representation of the expected data object from the client device, and (ii) compare an aspect of the received data object with the representation of the expected data object. If the comparing identifies a difference between the aspect of the received data object and the representation of the expected data object, the system is configured to execute a protection action to limit a property of the received data object. In this way, the system protects the computer software application from a memory deserialization attack.

Yet another embodiment is directed to a computer program product for protecting computer applications from memory deserialization attacks. The computer program product comprises one or more non-transitory computer-readable storage devices and program instructions stored on at least one of the one or more storage devices. The program instructions, when loaded and executed by a processor, cause an apparatus associated with the processor to protect a computer application as described herein.

In an example embodiment, the program instructions cause an apparatus to receive a data object at a server hosting a computer software application. The program instructions also cause the apparatus to compare an aspect of the received data object with a representation of an expected data object. In turn, if the comparing identifies a difference between the aspect of the received data object and the representation of the expected data object, the program instructions cause the apparatus to execute a protection action to limit a property of the received data object, and, thus, protect the computer software application from a memory deserialization attack.

It is noted that embodiments of the method, system, and computer program product may be configured to implement any embodiments described herein.

BRIEF DESCRIPTION OF THE DRAWINGS

The foregoing will be apparent from the following more particular description of example embodiments, as illustrated in the accompanying drawings in which like reference characters refer to the same parts throughout the different views. The drawings are not necessarily to scale, emphasis instead being placed upon illustrating embodiments.

DETAILED DESCRIPTION

A description of example embodiments follows. Embodiments provide improved functionality to protect a computer application from memory deserialization attacks.

1. Introduction

Security controls for software applications may be classified according to a point in time at which protection is applied, relative to an action involving an instance of malware received from a potential attacker.

A first class includes security controls that attempt to stop such a cyberattack before malicious content from the attacker is consumed by a vulnerable application. These solutions inspect incoming traffic, looking for content that matches known malicious content. Some examples of these controls include intrusion prevention systems (IPS), host intrusion prevention (e.g., micro segmentation) systems (HIPS), and web application firewalls. One attack type that these solutions are ill-equipped to handle is a memory deserialization attack. In such an attack, a unit of "code" in a payload received from a bad actor may display little to no pattern, and thus be difficult for these solutions to recognize, especially if the payload is heavily encrypted or (multi) encoded.

A second class includes security controls that attempt to stop such an attack after the application has ingested and begun processing malicious data sent by a bad actor. These solutions monitor the application at runtime for indicators of compromise. These solutions typically monitor system call activity on each thread of the application and compare sequences of system calls against a system call sequence exhibited by known malware. Some examples of these solutions include endpoint detection and response (EDR), HIPS, and endpoint protection platforms (EPPs). These solutions, however, suffer from two serious issues. Firstly, the quantity of new instances of malware released daily is north of 350,000. This makes it difficult to detect evolving threats for which the indicators of compromise (IOCs) have not been generated yet. A second issue is that these solutions are not "application aware," and thus cannot distinguish between a normal application execution sequence and a malicious execution sequence. Declaring an attack too early affects functionality. Declaring that an application is under attack too late means the attacker has succeeded. A memory deserialization attack exploits the inability of post-execution-class security controls to remain undetected for a long time.

A third and newly minted "application aware" class of security controls work inline within the application. One such category of security controls is known as a moving target defense (MTD) control. This type of security control works by rearranging library code so that the attacker will not be able to find instructions they need for their exploit code to execute with precision. These tools are completely exposed by interpreted code, i.e., where the application generates code on the fly. Furthermore, all these tools do is to move the vulnerability around. Security experts have rejected such security controls that attempt to provide security by obfuscation since 1851 (which is described at https://en.wikipedia.org/wiki/Security_through_obscurity).

Another class of inline security control is runtime-application self-protection (RASP). RASP works by inspecting HTTP traffic deeper in the application where encryption and encoding has been stripped and raw content, about to be consumed by the web application, is available. These security control tools do not follow the business logic of the application long enough to detect and protect against a scenario in which the business logic generates code, such as, for example, SQL statements, for execution on downstream interpreters. Such a lack of visibility into code generated in real-time renders the aforementioned security control tools imprecise and non-deterministic.

2. How Memory Deserialization Attacks Work

There are many forms of deserialization attacks. They can include simple ones, wherein a key or an attribute of a serialized object can be manipulated. Another variant of a deserialization attack involves magic methods that are called automatically and are invoked when an object is deserialized. Developers frequently overload these magic methods to achieve desired functionality, which an attacker can use to execute arbitrary code, including adding a file on disk or deleting a file on disk, running exec( ) on the bash shell, etc. A third variety of deserialization attack goes even deeper, wherein members of an object, such as an HTTP context object, can be compiled on the fly to create a class and method with arbitrary code of an attacker's choosing, directly in memory. This latter class is especially insidious in that there is no footprint left on disk.

Figure 1:
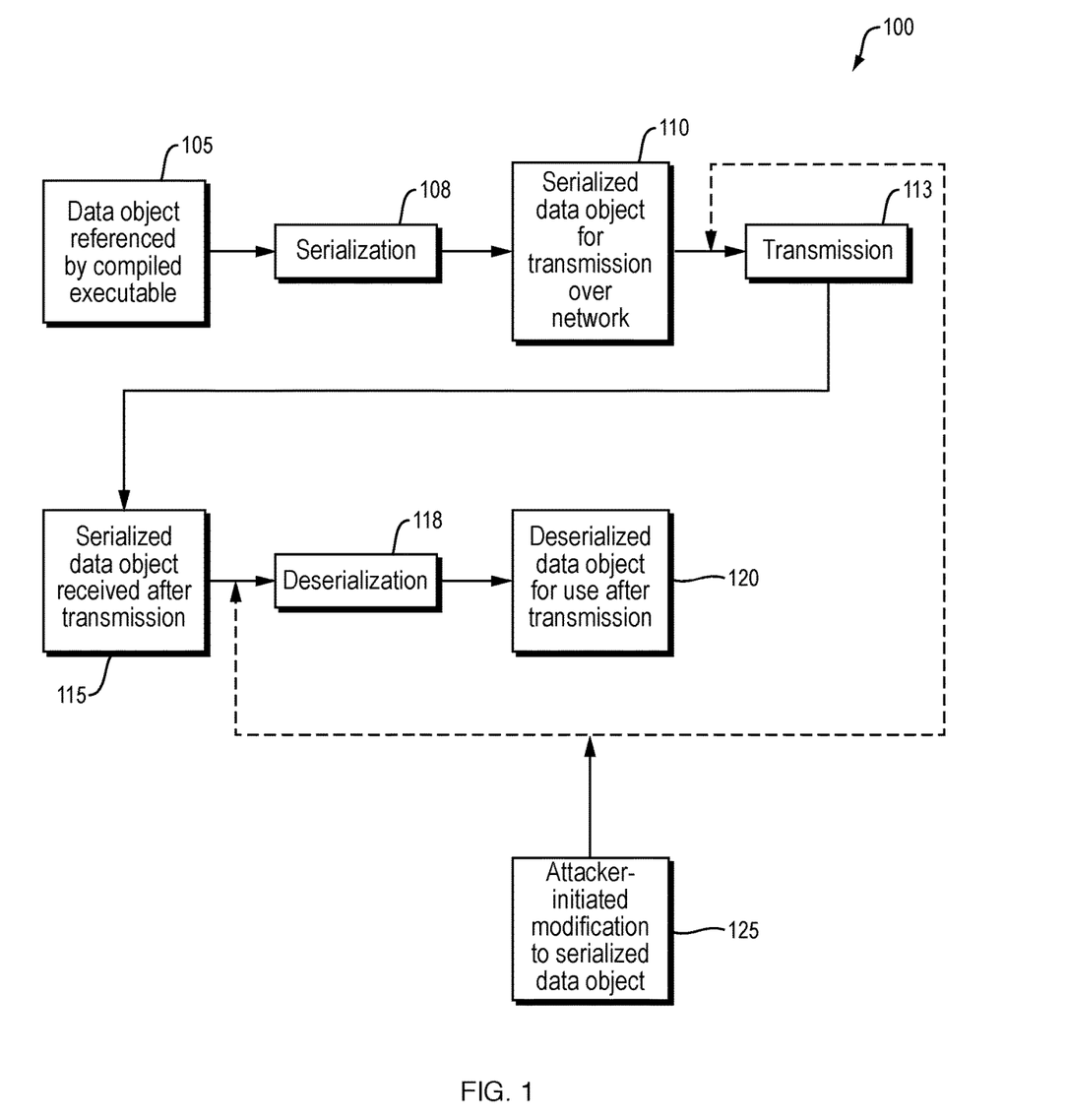
FIG. 1 is a block diagram showing example implementations of a memory deserialization attack.

FIG. 1 is a block diagram 100 illustrating a pair of possible implementations of memory deserialization attacks that an attacker may launch against a computer application. Such attacks may be launched while a data object 105 is in a serialized state 110 for transmission 113 across a network. As such, the attacks may take place after a serialization process 108 converts the data object 105 to the serialized state 110, or before a deserialization process 118 converts the data object 105 back to a deserialized state 120 after transmission 113. Such attacks may include an attacker-initiated modification 125 to the serialized data object 110, 115.

2.1. Basic Deserialization Attacks

A process of serialization involves converting complex hierarchical data structures into a binary or text format ready for transmission over a network. After such transmission, a process of deserialization converts the data back into the hierarchical format for use by an application. Practically all interpreted languages provide methods to serialize and deserialize data.

An example in PHP may look like the following. Consider an object "User" with the attributes:

$user→name="carlos";
$user→isLoggedIn=true;

When this object is serialized, the object may morph into the string:

O:4:"User":2: {s:4:"name";s:6:"Carlos"; s:7:"isAdmin": b:0;}

This byte stream can be interpreted as:

O:4:"User"—An object with the 4-character class name "User"

2—the object has 2 attributes s:4:"name"—The key of the first attribute is the 4-character string "name"

s:6:"carlos"—The value of the first attribute is the 6-character string "carlos"

s:7:"isAdmin"—The key of the second attribute is the 10-character string "isLoggedIn"

O:0—The value of the second attribute is the boolean value false

A simple deserialization vulnerability can be when an attacker could change the above string to:

O:0:4:"User":2: {s:4:"name";s:6:"Carlos"; s:7:"isAdmin":b:1;}

This would allow the user "Carlos" to be logged in as an Admin if the application blindly trusted the data and, therefore, the user Carlos may get administrative rights in the application. This flavor of deserialization attack is rather simplistic, with but a singular value being manipulated. However, if a value can be manipulated, an attribute can also be affected, and a whole new object itself can be created.

2.2. Magic Method-Based Deserialization Attacks

Another variant of deserialization attack, in many programming languages, involves execution of "magic methods." These methods are special methods that a developer does not have to explicitly invoke. Instead, these methods are invoked automatically on an event.

An example of a magic method in Python can be seen here: https://www.tutorialsteacher.com/python/magic-methods-in-python. For example, when two numbers are added using the +operator, internally, the _add_( )method will be called.

Similarly, an example of a magic method in Java can be seen at https://dzone.com/articles/java-serialization-magic-methods-and-use-cases. Java provides a Serialize class that allows users to easily serialize and deserialize their content. Developers enhance the base functionality by overloading these methods to add their "enhanced" functionality.

JavaScript provides similar capability through a built in JavaScript object called "Proxy," as shown here: https://developer.mozilla.org/en-US/docs/Web/JavaScript/Reference/Global_Objects/Proxy.

2.3. Gadget Chains

A gadget is a snippet of legitimate code that can be chained with one or more other gadgets to create entirely new functionality. The attacker can use input data that, when serialized, creates an initiator gadget. Input data, combined with the initiator gadget, can be used to chain a bunch of follower gadgets to finally execute a gadget chain. Attackers are known to use tools such as "yoserial" to create gadgets in known and commonly used Java libraries.

2.4. Advanced Deserialization Attacks

A variant of a deserialization attack was recently showcased in the following .NET code extracted from:

```
https://www.virustotal.com/gui/file/c15abaf51e78ca56c0376522d699c978217bf041a3bd3c71d09
193efa5717c71/community:
    using Microsoft.CSharp;
    using SolarWinds.Logging;
    using SolarWinds.Orion.Web.DAL;
    using System;
    using System.CodeDom.Compiler;
    using System.Collections.Generic;
    using System.Collections.Specialized;
    using System.IO;
    using System.Linq;
    using System.Web;
    public class LogoImageHandler : IHttpHandler
    {
    private static Log _log = new Log( );
    public bool IsReusable => false;
    public void ProcessRequest(HttpContext context)
    {
    try
    {
    string codes = context.Request["codes"];
    string clazz = context.Request["clazz"];
    string method = context.Request["method"];
    string[ ] args = context.Request["args"].Split('\n');
    context.Response.ContentType = "text/plain";
    context.Response.Write(this.DynamicRun(codes, clazz, method, args));
    }
    catch (Exception ex)
    {
    }
    NameValueCollection queryString =
    HttpUtility.ParseQueryString(context.Request.Url.Query);
    try
    {
    string str1 = queryString["id"];
    string s;
    if (!(str1 == "SitelogoImage"))
```

```
{
if (!(str1 == "SiteNoclogoImage"))
throw new ArgumentOutOfRangeException(queryString["id"]);
s = WebSettingsDAL.get__NewNOCSiteLogo( );
}
else
s = WebSettingsDAL.get__NewSiteLogo( );
byte[ ] buffer = Convert.FromBase64String(s);
if ((buffer == null || buffer.Length == 0) &&
File.Exists(HttpContext.Current.Server.MapPath("//NetPerfMon//images//NoLogo.gif")))
buffer =
File.ReadAllBytes(HttpContext.Current.Server.MapPath("//NetPerfMon//images//NoLogo.gif"))
;
  string str2 = buffer.Length < 2 || buffer[0] != byte.MaxValue || buffer[1] != (byte) 216
? (buffer.Length < 3 || buffer[0] != (byte) 71 || buffer[1] != (byte) 73 || buffer[2] != (byte) 70) ?
(buffer.Length < 8 || buffer[0] != (byte) 137 || buffer[1] != (byte) 80 || buffer[2] != (byte) 78) ||
(buffer[3] != (byte) 71 || buffer[4] != (byte) 13 || buffer[5] != (byte) 10 || buffer[6] != (byte) 26))
|| buffer[7] != (byte) 10 ? "image/jpeg" : "image/png") : "image/gif") : "image/jpeg";
  context.Response.OutputStream.Write(buffer, 0, buffer.Length);
  context.Response.ContentType = str2;
  context.Response.Cache.SetCacheability(HttpCacheability.Private);
  context.Response.StatusDescription = "OK";
  context.Response.StatusCode = 200;
  return;
}
catch (Exception ex)
{
LogoImageHandler.__log.Error((object) "Unexpected error trying to provide logo
image for the page.", ex);
}
  context.Response.Cache.SetCacheability(HttpCacheability.NoCache);
  context.Response.StatusDescription = "NO IMAGE";
  context.Response.StatusCode = 500;
}
public string DynamicRun(string codes, string clazz, string method, string[ ] args)
{
ICodeCompiler compiler = new CSharpCodeProvider( ).CreateCompiler( );
CompilerParameters options = new CompilerParameters( );
options.ReferencedAssemblies.Add("System.dll");
options.ReferencedAssemblies.Add("System.ServiceModel.dll");
options.ReferencedAssemblies.Add("System.Data.dll");
options.ReferencedAssemblies.Add("System.Runtime.dll");
options.GenerateExecutable = false;
options.GenerateInMemory = true;
string source = codes;
CompilerResults compilerResults = compiler.CompileAssemblyFromSource(options,
source);
if (compilerResults.Errors.HasErrors)
{
// ISSUE: reference to a compiler-generated field
// ISSUE: reference to a compiler-generated field
// ISSUE: reference to a compiler-generated field
// ISSUE: method pointer
  string.Join(Environment.NewLine, (IEnumerable<string>)
Enumerable.Select<CompilerError, string>((IEnumerable<M0>)
compilerResults.Errors.Cast<CompilerError>( ), (Func<M0, M1>)
(LogoImageHandler.\u003C\u003Ec.\u003C\u003E9___3_0 ??
(LogoImageHandler.\u003C\u003Ec.\u003C\u003E9___3_0 = new Func<CompilerError,
string>((object) LogoImageHandler.\u003C\u003Ec.\u003C\u003E9,
___methodptr(\u003CDynamicRun\u003Eb___3_0))))));
  Console.WriteLine("error");
  return compilerResults.Errors.ToString( );
}
  object instance = compilerResults.CompiledAssembly.CreateInstance(clazz);
  return (string) instance.GetType( ).GetMethod(method).Invoke(instance, (object[ ])
args);
  }
 }
}
```

As can be seen in the body of the DynamicRun method, the attacker was able to create a user-controlled method called "method" in a class called "clazz" that took in arguments in "args" with the body of the code in "codes." All four of these fields were present in the HTTP Context Object. The .NET Framework provides an interface called ICodeCompiler that allowed the class and method to be compiled on the fly.

2.5 Characteristics of Deserialization Attacks

Some deserialization attacks arise because the server application blindly trusts user provided data. In these attacks, no "code" is being dispatched by the attacker. These attacks are best addressed by establishing irrevocable trust between the source and the sink. These types of attacks that involve manipulating stateful key or attribute data shall be referred to as a Deserialization Attack Type 1 (i.e., Parameter Tinkering).

Another deserialization attack involves the attacker sending "special objects" for use with a totally different class concealed in the data being sent towards an application. The incoming "object" calls an unexpected class that is not part of the code of the original class. These types of attacks that inject code into legitimate code shall be referred to as a Deserialization Attack Type 2 (i.e., Object Injection).

Yet another deserialization attack involves user data containing Magic Method triggers in user provided objects. This can allow the attacker to have arbitrary methods of their choosing be executed by the application. These types of attacks that inject magic method triggers into user provided objects shall be referred to as a Deserialization Attack Type 3 (i.e., Magic Method Overload).

Yet another type of attack causes a brand-new class, that was not part of the original code loaded by the application, to be instantiated in memory. These types of attacks that inject magic method triggers into user provided objects shall be referred to a Deserialization Attack Type 4 (i.e., On the Fly Compilation).

3. Automatic Protection Against Various Types of Deserialization Attacks

Figure 2:
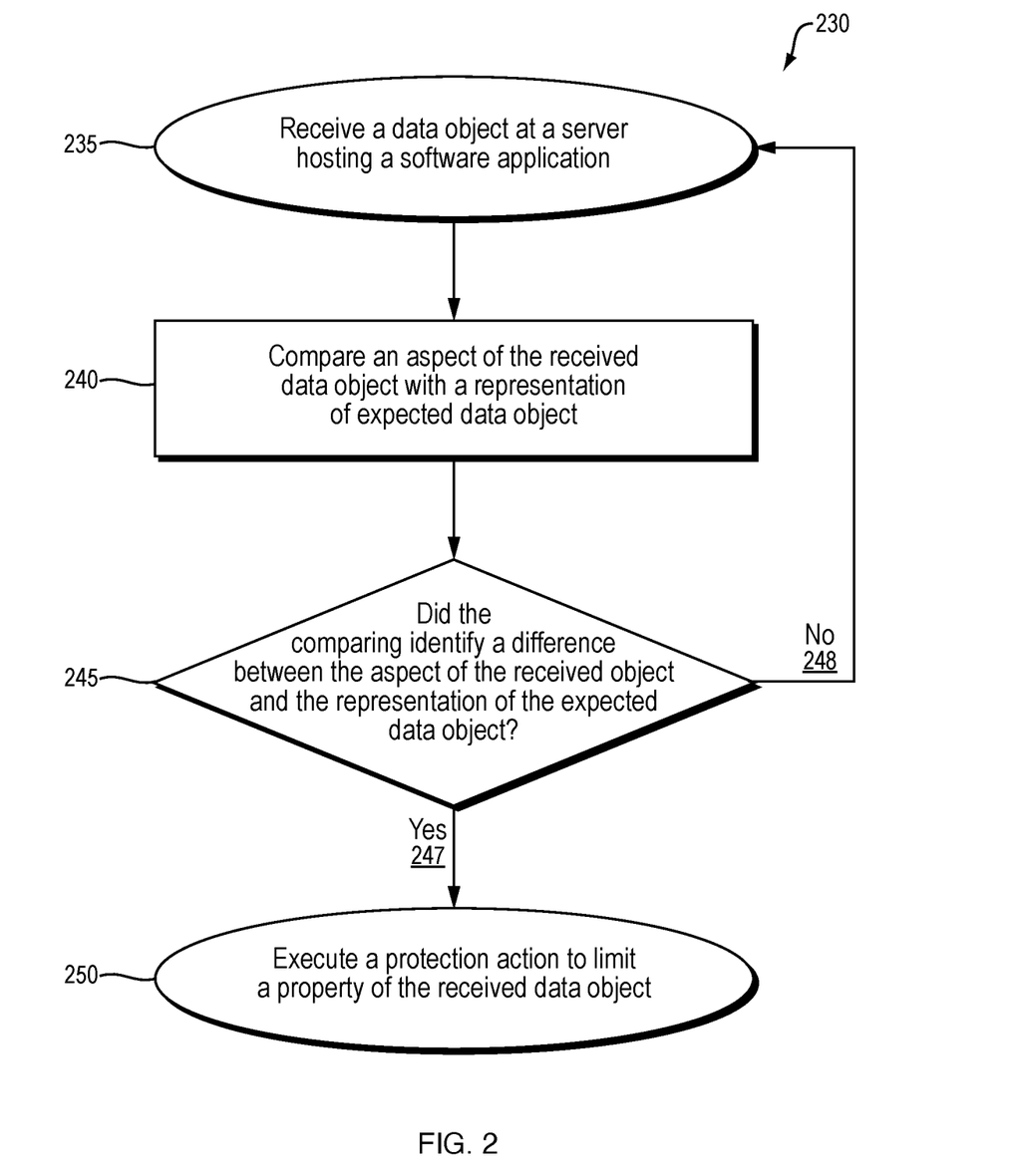
FIG. 2 is a flow diagram of a method for protecting a computer application from a memory deserialization attack according to an embodiment.

FIG. 2 is a flow diagram illustrating an example embodiment of a method 230 of protecting a software application from a memory deserialization attack. The method 230 begins by receiving 235 a data object at a server hosting a software application. Next, an aspect of the received data object 235 is compared 240 with a representation of an expected data object. It is then determined 245 whether the comparing 240 has identified a difference between the aspect of the received data object and the representation of the expected data object. If the comparing 240 has identified such a difference 247, a protection action is executed 250 to limit a property of the received data object. If, however, the comparing 240 has not identified such a difference 248, the method 230 continues by repeating the described process for a new data object received 235.

Figure 3:
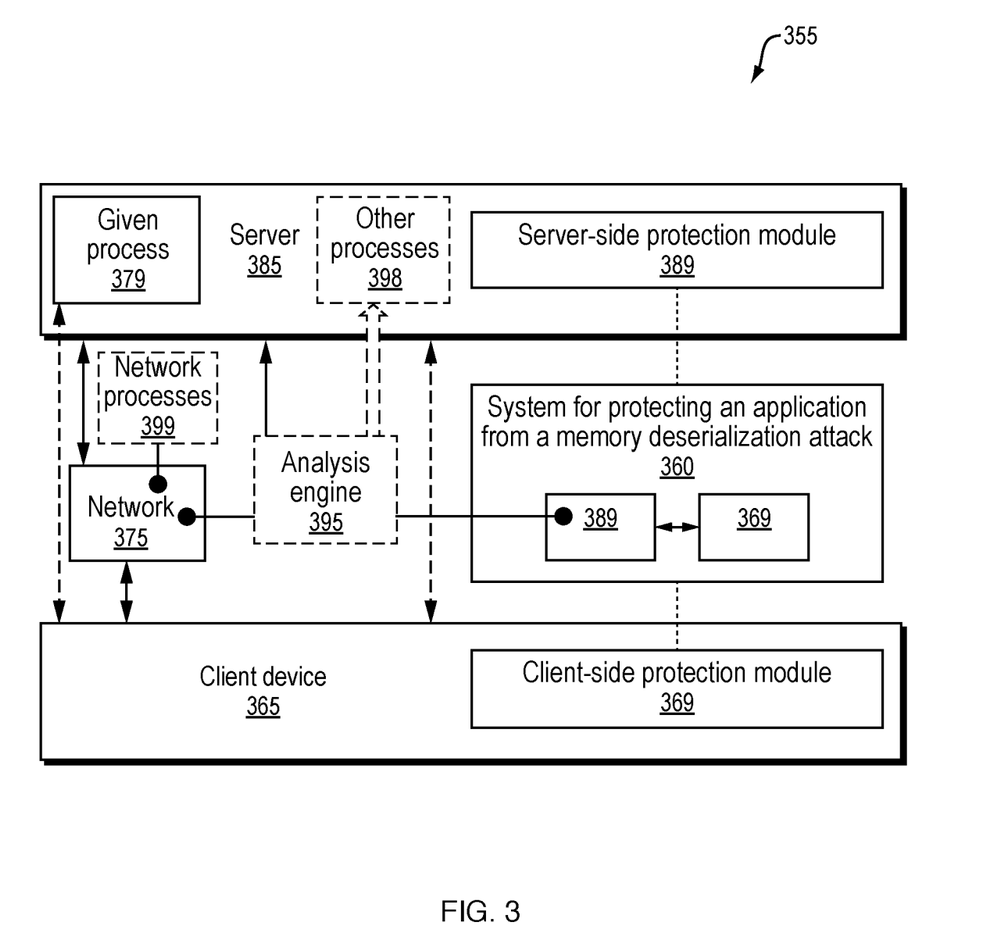
FIG. 3 is a schematic block diagram illustrating a system for protecting a computer application from a memory deserialization attack according to an embodiment.

FIG. 3 is a schematic block diagram 355 illustrating an example embodiment of a system 360 for protecting a software application from a memory deserialization attack in an example implementation between a client device 365 connected across a network 375 with a server 385. The system 360 includes a client-side protection module 369 implemented on the client device 365, and a server-side protection module 389 implemented on the server 385. Embodiments of the client-side protection module 369 and server-side protection module are configured to perform steps of a method of protecting the computer application from memory deserialization attacks, such as the method 230, as described hereinbelow.

It can be seen that FIG. 3 portrays the protection system 360 and server 385 as employed by a given process 379 running on the server 385 and potentially interfacing with the client device 365. In some embodiments, the given process 379 is a first process, and an analysis engine 395 is a second process running on a server 385 hosting a software application. In some such embodiments, the analysis engine 395 is configured to protect the given process 379 in conjunction with the protection system 360, as described in more detail hereinbelow. Such a configuration involving direct protection of the given process 379 by the analysis engine 395 may be referred to as a sidecar mode, as the analysis engine 395 runs in parallel with the given process 379, like a sidecar. An optional sidecar mode is represented in FIG. 3 by a direct connection of the analysis engine 395 to the server-side protection module 389 deployed on the server 385 of the protection system 360.

In other such embodiments, as shown in FIG. 3, the analysis engine 395 is configured to protect multiple processes running on a single server 385, including the given process 379, as well as other processes 398 running on the server 385 and potentially interfacing with the client device 365. Such a configuration involving protection of the given process 379 and other processes 398 running on the server 385 may be referred to as a daemon mode.

In still other such embodiments, the analysis engine 395 can be seen in FIG. 3 to function as a service available on the network 375 in order to protect still other processes running on other servers connected to the network 375. Such other processes running on other servers are referred to in FIG. 3, and herein, as network processes 399. Such a configuration involving protection of network processes 399 may be referred to as a network mode.

In any of the aforementioned embodiments involving the analysis engine 395, the analysis engine 395 may be configured to report results of protecting processes to the server 385, wherein the results can include declarations of a threat of attack.

Four distinct classes of deserialization attacks are described in section 2.5 above, namely, Deserialization Attacks Type 1 (Parameter Tinkering), Type 2 (Object Injection), Type 3 (Magic Method Overload), and Type 4 (On the Fly Compilation). Embodiments, e.g., the method 100, provide protection against each of these classes or types of deserialization attacks as described hereinbelow.

Existing security controls, as described hereinabove in Section 1, focus on examining the data that the attacker is sending. Embodiments, e.g., the method 100, instead focus on examining the code that is executing, and whether it came from the original application provider or from elsewhere. This is a very deterministic process.

3.1 Protecting Against Deserialization Attack Type 1

In some embodiments, on the client side 369, a special JavaScript pushed by the server 385 into the user's browser or client 365 computes a hash of an entire user-provided data packet 105 and any encoded objects. Such a hash of the user-provided packet may represent an expected data object in a comparison 240. Such data packet 105 and encoded objects may comprise a method or a class, to be referred to as a source method or a source class. The JavaScript uses the Content Type and Boundary parameters, if Content type is multi-part, to detect objects such as JSON, XML, SOAP, GWT etc. All objects have the Content Type set to Object. Please see the definition of Content Type and Boundary at https://www.w3.org/Protocols/rfc1341/7_2_Multipart.html.

In such embodiments, language-specific deserialize methods 118 are hooked by the server side module 389. Embodiments may then inspect 235 incoming data 105 before a deserialize method 118 is invoked on the server side. During this pre-deserialize inspection, the computed hash of the data object serialized 108 at the client device 365 is checked and compared 240 with a hash of the user-provided data received 235 by the server 385. The hash of the user-provided data received by the server 385 may thus serve as an appropriate aspect of the received data object for the comparison 240. Embodiments may also check if an object is a nested object, being embedded within a boundary of another object.

If, according 245 to the comparison 240, any condition is flouted 247, e.g., the hash of the user-provided data received 235 at the server 385 does not match the hash of the object serialized 108 at the client device 365, server instrumentation (i.e., instrumentation supporting the server-side pre-deserialize hook functionality) will declare that a threat was encountered.

In some embodiments, such server instrumentation may comprise the analysis engine 395. In such embodiments, receipt of both the hash of the user-provided data received 235 at the server 385, and the hash of the object serialized 108 at the client device 365, by the analysis engine 395, may be considered to constitute an indication of a difference therebetween. Upon identification of such a difference, the analysis engine 395 may invoke a user-approved protection action 250.

Embodiments may also check if a sink class/method, called by a source class/method of the user-provided data, is part of the user-provided source class/method. If not, then embodiments may designate the sink class/method as extraneous, snapshot this extraneous class/method and output, e.g., to a database or to a user, information thereof as forensic information collected about the attack.

In some embodiments, such a threat, as declared by server instrumentation, is reported to a central management system (CMS). The CMS may have also pushed a protection policy to ensure that when a Type 1 attack occurs, a user-approved protection action is triggered 250 in real time. An example of a user-approved protection action 250 may be to log off the remote end user performing the malicious action. Other examples of user-approved protection actions 250 may include interrupting communication between the server 385 and a client device 365 of the user, and suspending, terminating, or restarting the software application. The user may be able to specify, via a security policy, which out of several choices of protection actions are to be invoked.

If, however, according 245 to the comparison 240, the hash of the user-provided data received 235 at the server 385 does match the hash of the object serialized 108 at the client device 365, and no other conditions are flouted 248, embodiments allow the application to proceed normally, while continuing to monitor 235 incoming data for potential memory deserialization attacks.

3.2 Protecting Against Deserialization Attack Type 2

Some embodiments are configured to decompile business logic of an application, thus extracting classes and methods used by the application's developer. The resulting human readable decompiled output may be parsed to extract the external, i.e., sink, classes/methods referenced by each class/method of the business logic. Valid linkings between classes, between methods, or between at least one class and at least one method of the software application are thus defined.

Embodiments aggregate such valid linkings to create an interpreted control flow map of class/method invocations. Relationships of source classes/methods to target, i.e., sink, classes/methods, will thus be defined in individual records in the control flow map of the application's business logic.

Such valid linkings, e.g., records of the control flow map, may represent expected data objects in a comparison 240. As such, in some embodiments, when any source class invokes methods from another, i.e., target, class at run time, causing data associated with the target class to be received 235 at the server 385, embodiments are configured to compare 240 an aspect of the received data with the expected data objects by checking if the combination of source and target class/methods is represented in the application's interpreted control flow map.

If, according 245 to the comparison 240, any condition is flouted 247, e.g., the combination of source and target class/methods is not represented in the application's interpreted control flow map, server instrumentation (i.e., instrumentation supporting the server-side pre-deserialize hook functionality) will declare that a threat was encountered.

In some embodiments, such server instrumentation may comprise an analysis engine 395. In such embodiments, receipt of both the hash of the user-provided data received 235 at the server 385, and the hash of the object serialized 108 at the client device 365, by the analysis engine 395, may be considered to constitute an indication of a difference therebetween. Upon identification of such a difference, the analysis engine 395 may invoke a user-approved protection action 250.

Embodiments may also check if a sink class/method, called by a source class/method of the user-provided data, is part of the user-provided source class/method. If not, then embodiments may designate the sink class/method as extraneous, snapshot this extraneous class/method and output, e.g., to a database or to a user, information thereof as forensic information collected about the attack.

In some embodiments, such a threat, as declared by server instrumentation, is reported to a central management system (CMS). The CMS may have also pushed a protection policy to ensure that when a memory deserialization attack occurs, one or more user-approved protection actions are triggered 250 in real time. An example of a user-approved protection action 250 may be to log off the remote end user performing the malicious action. Other examples of user-approved protection actions 250 may include interrupting communication between the server 385 and a client device 365 of the user, and suspending, terminating, or restarting the software application. The user may be able to specify, e.g., via a security policy, which out of several choices of protection actions are to be invoked.

If, however, according 245 to the comparison 240, the combination of source and target class/methods is represented in the application's interpreted control flow map, and no other conditions are flouted 248, embodiments allow the application to proceed normally, while continuing to monitor 235 incoming data for potential memory deserialization attacks.

3.3 Protecting Against Deserialization Attack Type 3

Some embodiments configured to protect against Type 3 attacks are very similar to embodiments configured to protect against Type 2 attacks, such as the embodiments described above. One dissimilarity therebetween is that, since magic methods are instrumented in Type 3 attacks in conjunction with embodiments configured as described in Section 3.2 above, embodiments may specifically call out any control flow violations for magic methods, with such identification. In such embodiments, the user may thus exercise a separate protection action 250 for a Type 3 attack.

Examples of user-approved protection actions 250 that may be invoked in response to an attack capable of triggering a magic method may include terminating a login session of the remote end user performing the malicious action, interrupting communication between the server 385 and the client device 365 under control of a malicious user, and suspending, terminating, or restarting the software application. The user may be able to specify, e.g., via a security policy, which out of several choices of protection actions 250 are to be invoked.

3.4 Protecting Against Deserialization Attack Type 4

Some embodiments configured to protect against Type 4 attacks are very similar to embodiments configured to protect against Type 2 attacks, such as the embodiments described above.

Examples of user-approved protection actions 250 that may be invoked in response to an attack capable of employing on-the-fly compilation may include terminating a login session of the remote end user performing the malicious action, interrupting communication between the server and the client device 365 under control of a malicious user, and suspending, terminating, or restarting the software application. The user may be able to specify, e.g., via a security policy, which out of several choices of protection actions 250 are to be invoked.

4. Improvements Over Existing Functionality

Embodiments of the solutions presented herein are examples of deeply aware application protection functionality. Such embodiments extract legal class/methods for application business logic and extract a control flow of interpreted code. Embodiments also enforce control flow such that any attempt to violate the control flow is detected in real time, before damage occurs. Embodiments protect against all four variants of deserialization attacks described herein. Embodiments also allow the user to launch protection actions of their choosing in real time.

5. Computer and Network Operating Environment

Figure 4:
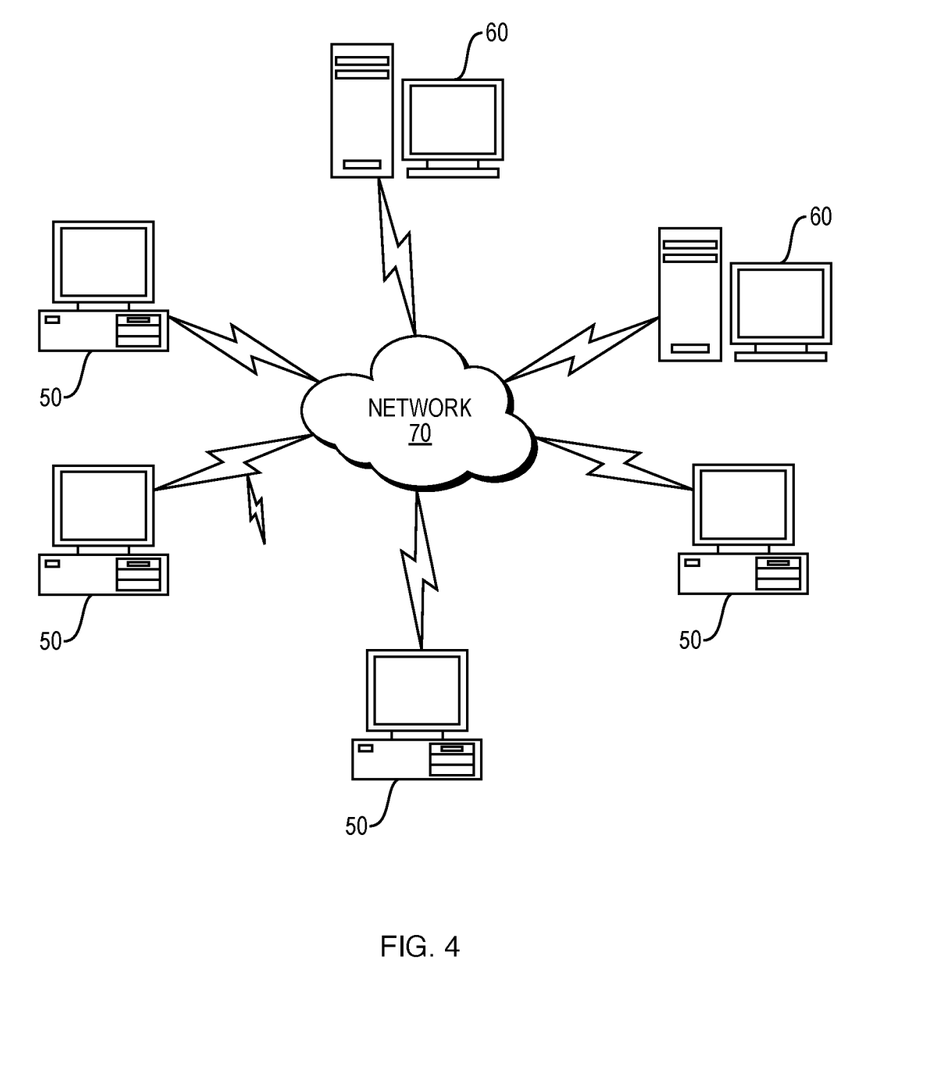
FIG. 4 illustrates a computer network or similar digital processing environment in which embodiments may be implemented.

FIG. 4 illustrates a computer network or similar digital processing environment in which embodiments of the present disclosure may be implemented.

Client computer(s)/devices 50 and server computer(s) 60 provide processing, storage, and input/output devices executing application programs and the like. The client computer(s)/devices 50 can also be linked through communications network 70 to other computing devices, including other client devices/processes 50 and server computer(s) 60. The communications network 70 can be part of a remote access network, a global network (e.g., the Internet), a worldwide collection of computers, local area or wide area networks, and gateways that currently use respective protocols (TCP/IP, Bluetooth®, etc.) to communicate with one another. Other electronic device/computer network architectures are suitable.

Figure 5:
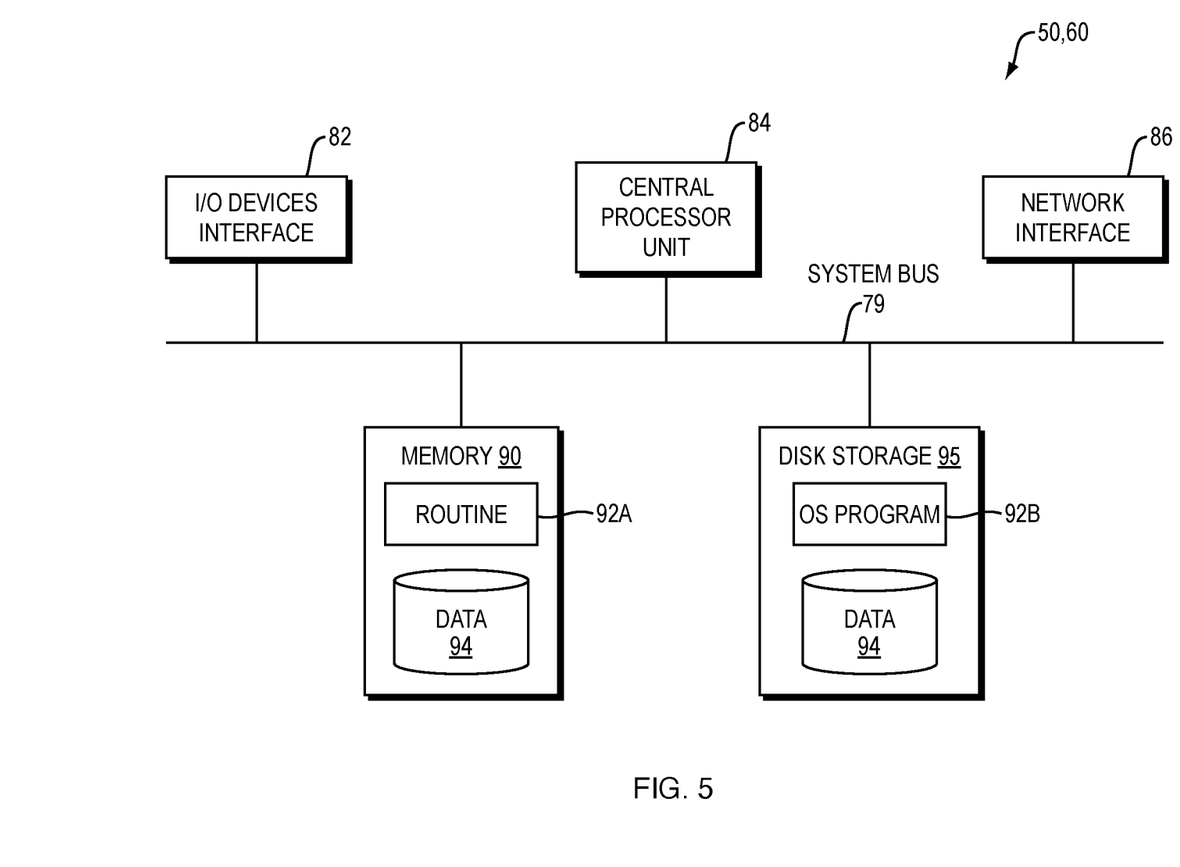
FIG. 5 is a diagram illustrating an example internal structure of a computer in the environment of FIG. 4.

FIG. 5 is a diagram of an example internal structure of a computer (e.g., client processor/device 50 or server computers 60) in the computer system of FIG. 4. Each computer 50, 60 contains a system bus 79, where a bus is a set of hardware lines used for data transfer among the components of a computer or processing system. The system bus 79 is essentially a shared conduit that connects different elements of a computer system (e.g., processor, disk storage, memory, input/output ports, network ports, etc.) that enables the transfer of information between the elements. Attached to the system bus 79 is an I/O device interface 82 for connecting various input and output devices (e.g., keyboard, mouse, displays, printers, speakers, etc.) to the computer 50, 60. A network interface 86 allows the computer to connect to various other devices attached to a network (e.g., network 70 of FIG. 4). Memory 90 provides volatile storage for computer software instructions 92 (shown in FIG. 5 as computer software instructions 92A and 92B) and data 94 used to implement an embodiment of the present disclosure. Disk storage 95 provides non-volatile storage for computer software instructions 92 and data 94 used to implement an embodiment of the present disclosure. A central processor unit 84 is also attached to the system bus 79 and provides for the execution of computer instructions.

In one embodiment, the processor routines 92 and data 94 are a computer program product (generally referenced 92), including a non-transitory computer-readable medium (e.g., a removable storage medium such as one or more DVD-ROM's, CD-ROM's, diskettes, tapes, etc.) that provides at least a portion of the software instructions for an embodiment. The computer program product 92 can be installed by any suitable software installation procedure, as is well known in the art. In another embodiment, at least a portion of the software instructions may also be downloaded over a cable communication and/or wireless connection. In other embodiments, the processor routines 92 and data 94 are a computer program propagated signal product embodied on a propagated signal on a propagation medium (e.g., a radio wave, an infrared wave, a laser wave, a sound wave, or an electrical wave propagated over a global network such as the Internet, or other network(s)). Such carrier medium or signals may be employed to provide at least a portion of the software instructions for the present processor routines/program 92 and data 94.

Embodiments or aspects thereof may be implemented in the form of hardware including but not limited to hardware circuitry, firmware, or software. If implemented in software, the software may be stored on any non-transient computer readable medium that is configured to enable a processor to load the software or subsets of instructions thereof. The processor then executes the instructions and is configured to operate or cause an apparatus to operate in a manner as described herein.

Further, hardware, firmware, software, routines, or instructions may be described herein as performing certain actions and/or functions of the data processors. However, it should be appreciated that such descriptions contained herein are merely for convenience and that such actions in fact result from computing devices, processors, controllers, or other devices executing the firmware, software, routines, instructions, etc.

It should be understood that the flow diagrams, block diagrams, and network diagrams may include more or fewer elements, be arranged differently, or be represented differently. But it further should be understood that certain implementations may dictate the block and network diagrams and the number of block and network diagrams illustrating the execution of the embodiments be implemented in a particular way.

Accordingly, further embodiments may also be implemented in a variety of computer architectures, physical, virtual, cloud computers, and/or some combination thereof, and, thus, the data processors described herein are intended for purposes of illustration only and not as a limitation of the embodiments.

The teachings of all patents, published applications and references cited herein are incorporated by reference in their entirety.

While example embodiments have been particularly shown and described, it will be understood by those skilled in the art that various changes in form and details may be made therein without departing from the scope of the embodiments encompassed by the appended claims.

What is claimed is:

1. A computer-implemented method of protecting a software application from a memory deserialization attack, the method including:

decompiling a software application to define a valid linking between classes, between methods, or between at least one class and at least one method of the software application;

receiving a data object at a server hosting the software application;

comparing (i) an aspect of the received data object with (ii) a representation of an expected data object, wherein (a) the aspect of the received data object is a runtime-requested linking between classes, between methods, or between at least one class and at least one method of the software application and (b) the representation of the expected data object is the defined valid linking; and if the comparing identifies a difference between (i) and (ii), executing a protection action to limit a property of the received data object, thereby protecting the software application from a memory deserialization attack.

2. The method of claim 1, wherein the received data object is a user-provided packet, the aspect of the received data object is a hash thereof, the expected data object is a copy of the user-provided packet made and serialized prior to the user-provided packet being received by the server; and the representation of the expected data object is a hash thereof.

3. The method of claim 1, wherein the decompiling is performed prior to the data object being received by the server.

4. The method of claim 1, further comprising building a control flow map for the software application by storing the defined valid linking in computer memory.

5. The method of claim 1, wherein the identified difference includes at least one different linking in the runtime-requested linking and the defined valid linking.

6. The method of claim 1, wherein the identified difference includes a reference to a magic method associated with the received data object.

7. The method of claim 1, wherein the identified difference includes a nested data object embedded within a boundary of the received data object.

8. The method of claim 1, further comprising reporting the identified difference to a central management system, and wherein the central management system is configured to automatically initiate the protection action in response to the identified difference.

9. The method of claim 1, wherein an analysis engine is configured to run in a sidecar mode, a daemon mode, or a network mode in relation to the application, the analysis engine providing instrumentational functionality to examine user-provided data being received at the server.

10. The method of claim 9, wherein the analysis engine is configured to automatically initiate the protection action in response to the identified difference.

11. The method of claim 1, wherein the protection action includes at least one of:
terminating a login session of a user;
interrupting communication between the server and a user; and suspending, terminating, or restarting the software application.

12. A system for protecting a software application from a memory deserialization attack, the system comprising a processor and a memory with computer code instructions stored thereon, the memory operatively coupled to said processor such that the computer code instructions configure the processor to implement:

a client-side protection module and a server-side protection module, wherein:

the client-side protection module is configured to:
establish a representation of an expected data object based on a data object present at a client device, the client device supporting the client-side protection module, the client device interfacing with a server hosting a software application; and the server-side protection module is configured to:
decompile the software application to define a valid linking between classes, between methods, or between at least one class and at least one method of the software application;

receive, at the server, the data object and the representation of the expected data object, from the client device;

compare (i) an aspect of the received data object with (ii) the representation of the expected data object, wherein (a) the aspect of the received data object is a runtime-requested linking between classes, between methods, or between at least one class and at least one method of the software application and (b) the representation of the expected data object is the defined valid linking; and if the comparing identifies a difference between (i) and (ii), execute a protection action to limit a property of the received data object, thereby protecting the software application from a memory deserialization attack.

13. The system of claim 12, wherein the received data object is a user-provided packet, the aspect of the received data object is a hash thereof, the expected data object is a copy of the user-provided packet made and serialized prior to the user-provided packet being received by the server; and the representation of the expected data object is a hash thereof.

14. The system of claim 12, wherein the server protection module is further configured to decompile the software application prior to the data object being received by the server.

15. The system of claim 12, wherein the server protection module is further configured to build a control flow map for the software application by storing the defined valid linking in computer memory.

16. The system of claim 12, wherein the identified difference includes at least one of a reference to a magic method associated with the received data object and a nested data object embedded within a boundary of the received data object.

17. The system of claim 12, further comprising a central management system, wherein the server protection module is further configured to report the identified difference to the central management system, and the central management system is configured to automatically initiate the protection action in response to the identified difference.

18. The system of claim 12, further comprising an analysis engine configured to run in a sidecar mode, a daemon mode, or a network mode in relation to the application, the analysis engine providing instrumentational functionality to examine user-provided data being received at the server.

19. The system of claim 18, wherein the server protection module is further configured to transmit an indication of the identified difference to the analysis engine, and the analysis engine is configured to automatically initiate the protection action in response to receiving the transmitted indication of the identified difference.

20. The system of claim 12, wherein the protection action includes at least one of: terminating a login session of a user; interrupting communication between the server and a user; and suspending, terminating, or restarting the software application.

21. A computer program product for protecting a computer application from memory deserialization attacks, the computer program product comprising:

one or more non-transitory computer-readable storage devices and program instructions stored on at least one of the one or more storage devices, the program instructions, when loaded and executed by a processor, causing an apparatus associated with the processor to:

decompile a software application to define a valid linking between classes, between methods, or between at least one class and at least one method of the software application;

receive a data object at a server hosting the software application;

compare (i) an aspect of the received data object with (ii) a representation of an expected data object, wherein (a) the aspect of the received data object is a runtime-requested linking between classes, between methods, or between at least one class and at least one method of the software application and (b) the representation of the expected data object is the defined valid linking; and if the comparing identifies a difference between (i) and (ii), execute a protection action to limit a property of the received data object, thereby protecting the software application from a memory deserialization attack.

* * * * *